United States Patent [19]

Pressman et al.

[11] 4,338,614

[45] Jul. 6, 1982

[54] ELECTROSTATIC PRINT HEAD

[75] Inventors: Gerald L. Pressman, Cupertino, Calif.; Robert A. Moore, Amherst, N.H.; Jeffrey B. Brooks, Keene, N.H.; Robert W. Sengstaken, Jr., Harrisville, N.H.

[73] Assignee: Markem Corporation, Keene, N.H.

[21] Appl. No.: 87,152

[22] Filed: Oct. 22, 1979

[51] Int. Cl.[3] .......... G01D 15/10

[52] U.S. Cl. .......... 346/155; 346/153.1; 346/159; 178/30

[58] Field of Search .......... 346/159, 153, 155, 158; 178/30

[56] References Cited

U.S. PATENT DOCUMENTS

| | | | |
|---|---|---|---|
| 2,706,788 | 4/1955 | Wiley . | |
| 2,890,343 | 6/1959 | Bolton . | |
| 3,266,046 | 8/1966 | Boyd . | |
| 3,358,289 | 12/1967 | Lee . | |
| 3,372,400 | 3/1968 | Epstein et al. . | |
| 3,438,053 | 4/1969 | Howell | 346/159 |
| 3,460,156 | 8/1969 | Byrd . | |
| 3,611,414 | 10/1971 | Frank | 346/159 |
| 3,611,419 | 10/1971 | Blumenthal . | |
| 3,689,935 | 9/1972 | Pressman et al. | 346/159 |
| 3,715,762 | 2/1973 | Magill et al. | 346/159 |
| 3,742,516 | 6/1973 | Cavanaugh et al. | 346/159 |
| 3,765,027 | 10/1973 | Bresnick . | |
| 3,961,574 | 6/1976 | Fotland . | |
| 3,962,969 | 6/1976 | Watanabe et al. . | |
| 3,971,465 | 7/1976 | Benn . | |
| 3,986,189 | 10/1976 | Van Biesen et al. . | |
| 4,013,004 | 3/1977 | Watanabe et al. . | |
| 4,016,813 | 4/1977 | Pressman et al. . | |
| 4,068,585 | 1/1978 | Thompson . | |
| 4,088,891 | 5/1978 | Smith et al. . | |
| 4,137,537 | 1/1979 | Takahashi et al. . | |

OTHER PUBLICATIONS

*Controlled Ion Flow Electrostatic Printing*; Pressman 1976, SID Int. Symp.; pp. 26–27.

*Primary Examiner*—Marshall M. Curtis

[57] ABSTRACT

An improved electrostatic print head is disclosed comprising a corona source, an aperture mask, a slotted focus plane, and a back plane electrode for supporting a moving dielectric print medium. The aperture mask includes two rows of staggered circular apertures which are surrounded by individual aperture electrodes on the side of the mask facing away from the corona source. The side of the aperture mask facing the corona source has a continuous conductive layer thereon which is biased at a fixed potential. The aperture electrodes are selectively pulsed with a control potential to control the flow of ions from the corona source through the two staggered rows of apertures and the slotted focus plane to form any desired dot-matrix latent image on the moving dielectric print medium. The center line of the slotted focus plane is parallel to the center line between the two staggered rows of apertures to focus the ion beams defined by the individual apertures toward the center line of the slot while intensifying the electric field in the imaging region. The slotted focus plane also compresses the cross section of the ion beams defined by the individual apertures into ellipses having their minor axes parallel to the direction of motion of the dielectric print medium, permitting higher ion densities to be deposited on a moving dielectric print medium for a given final dot size and an improved resolution of the final dot-matrix image.

16 Claims, 7 Drawing Figures

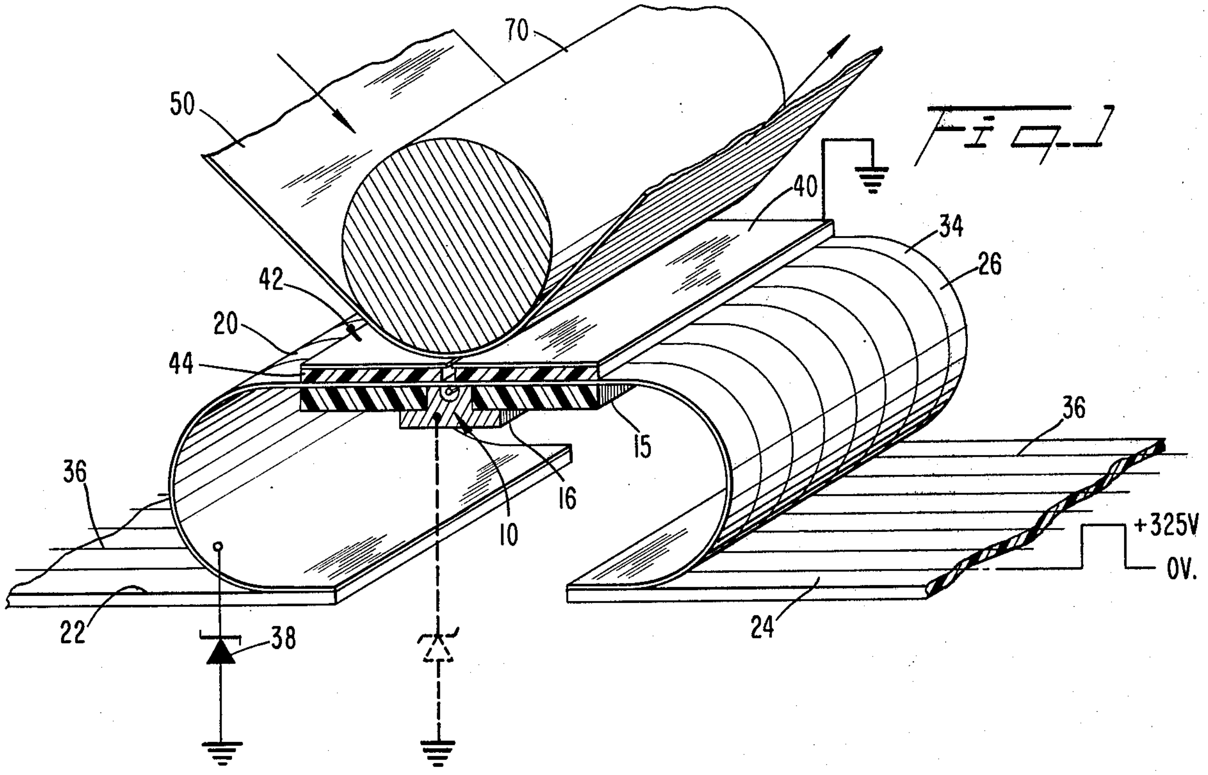
Fig-1
Fig-2
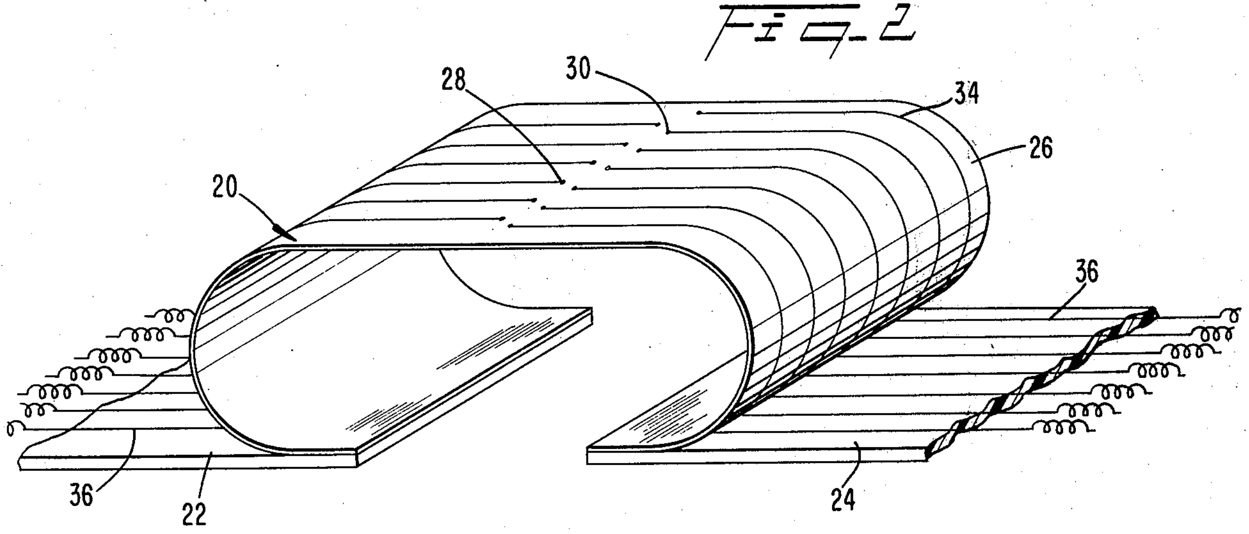
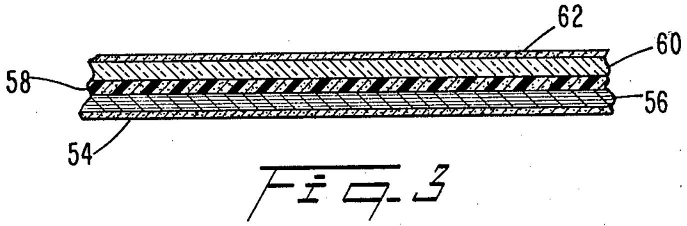
Fig-3

ELECTROSTATIC PRINT HEAD

BACKGROUND OF THE INVENTION

1. Field of the Invention

The present invention relates to print heads for electrostatic printing systems.

2. Discussion of the Prior Art

FIG. 7 of U.S. Pat. No. 3,689,935, entitled "Electrostatic Line Printer," discloses an electrostatic particle modulator 50 having two staggered rows of modulated apertures for forming dot-matrix images on a moving print medium. The individual circular apertures are surrounded by individual electrodes which permit modulation of toner particles propelled through the apertures. Rather than projecting toner particles directly through the modulated apertures, the particle modulator can be used to modulate a stream of ions to form latent images on a dielectric print medium which is then subjected to developing and fixing operations. The disclosed particles modulation system is, however, characterized by certain inherent limitations that tend to limit its utility in making high resolution prints such as bar codes, which are useful for encoding commercial product identification data on labels and the like.

It is believed that the difficulty in imaging high resolution information with the print head of U.S. Pat. No. 3,689,935 is caused by several factors. To print with the apparatus of FIG. 7 of U.S. Pat. No. 3,689,935, a first row of dots is imaged on the dielectric print medium from one or more of the apertures within either aperture row 53 or 54. At a later time which is a function of the velocity of the print medium, a second group of dots is imaged thereon from the remaining aperture row. After the first row of ion dots is imaged on the print medium, its charges tend to repel the like charges of the second row of dots as the latter are being imaged upon the print medium to fill in the vacant spaces left between the dots of the first row. The repulsion of the second row of dots by the first row of dots introduces a stagger into the merged row of dots and thus degrades the smoothness of printed edges that are perpendicular to the direction of motion of the dielectric print medium. A second factor is that the circular dot shapes produced by the circular apertures do not readily merge into straight-edged printed lines. A third factor arises out of the fact that the cross-sectional density of the circular ion beam defined by each aperture limits the density of the ion image deposited on the moving print medium.

Modification of the size and shape of electrostatically imaged dots in charge retentive media has been accomplished in the prior art, such as for example in U.S. Pat. No. 3,438,053, wherein it is suggested that the spot images deposited by a row of closely spaced pin-type electrodes may be rendered elliptical by the interposition of a common slot-shaped aperture between the pin electrodes and the print medium. The prior art does not, however, address the above-mentioned problems which are encountered when imaging is carried out by ion beam techniques on a moving medium using plural staggered rows of electrically modulated apertures as taught in the aforementioned U.S. Pat. No. 3,689,935.

SUMMARY OF THE INVENTION

The present invention is an improvement of the print head disclosed in U.S. Pat. No. 3,689,935, characterized by improved resolution in the direction of motion of the dielectric print medium. The invention has particular utility for printing successive straight lines, such as bar codes used for encoding the identification of products, but is equally useful for printing ordinary alpha-numeric information.

The improved resolution of the print head of the present invention is attributable to the addition of a slotted focus plane between the aperture mask and back electrode described in the aforementioned U.S. Pat. No. 3,689,935. The center line of the slot is parallel to the rows of apertures and perpendicular to the direction of travel of the dielectric print medium. The focus plane has a bias potential applied thereto, which may be ground or reference potential, and modifies the field configuration that defines the ion paths between the aperture mask and the print medium so as to counteract the effect of the resolution-degrading factors referred to previously.

Printing of high resolution images such as bar codes or alpha-numeric information is accomplished by the pulsing of one or more of the individual aperture electrodes contained within a first row of aperture electrodes and the subsequent pulsing of one or more of the individual aperture electrodes contained within a second row of aperture electrodes to form a line segment on the moving dielectric print medium having an edge which is perpendicular to the direction of travel of the dielectric print medium. Often, the first row of aperture electrodes will be pulsed to begin forming a second line of dots while the second row of aperture electrodes are pulsed to fill in the gaps left by the first aperture row in a previously-formed line. This will be the case, for example, when it is desired to print several complete lines of dots in close succession to form a vertical bar that is several dots in width.

The presence of the slotted focus plane between the aperture mask and the moving dielectric print medium (1) counteracts the repulsion of the ions deposited by the second row of apertures due to the ions previously deposited on the dielectric print medium by the first row of apertures in a direction parallel to the direction of travel of the print medium by intensifying the ion-accelerating field near the print medium, (2) focuses the ion beams produced by the two staggered rows of apertures toward the center line of the slot, and (3) compresses the circular cross section of the ion image passed by each individual aperture into an elliptical cross section having its minor axis in a direction parallel to the direction of travel of the dielectric print medium. The elliptical cross section permits the imaging of higher ion densities because the aperture electrodes may be activated for a longer period of time to achieve a given final dot size on the moving dielectric print medium measured in the direction of travel of the print medium. Moreover, projecting an ion beam of elliptical cross section onto a moving dielectric print medium forms slightly squared-off dot images which are well suited for creating the smooth-edged bars necessary for printing bar code information.

BRIEF DESCRIPTION OF THE DRAWINGS

The novel features of the invention will be more fully understood from the following detailed description when read in connection with the accompanying drawings in which like reference numerals refer to like parts:

FIG. 1 is an isometric view of an electrostatic print head embodying the invention;

FIG. 2 illustrates the aperture mask assembly of FIG. 1;

FIG. 3 is a cross-sectional view of a dielectric print medium which may be employed in connection with the embodiment of FIG. 1;

DETAILED DESCRIPTION

Figure 4:
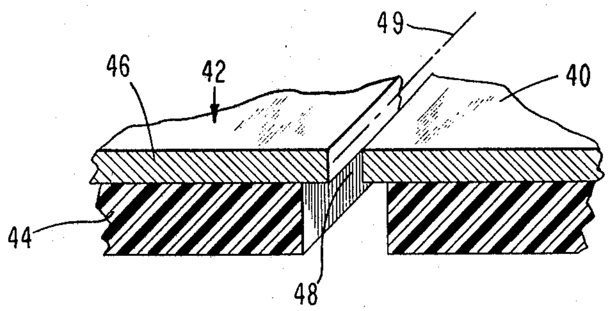
FIG. 4 is a partial sectional view illustrating the detailed construction of the slotted focus plane illustrated generally in FIG. 1.

FIG. 1 illustrates an electrostatic printing system in accordance with the invention which has a corona discharge assembly 10 for producing a source of ions which are to be imaged on a dielectric print medium illustrated in FIG. 3, an aperture mask assembly 20 which has two rows of staggered apertures (not illustrated in FIG. 1) which image ions upon a dielectric print medium 50, a slotted focus plane 40 which focuses the ion beams defined by the two rows of staggered apertures in a direction parallel to the direction of travel of the moving dielectric print medium, and a conductive back plane 70 on which the moving dielectric print medium is movably supported during imaging of the ions. The detailed construction of each of the component parts of the system discussed above is described hereinafter with reference to one or more additional Figures.

CORONA DISCHARGE ASSEMBLY

Figure 5:
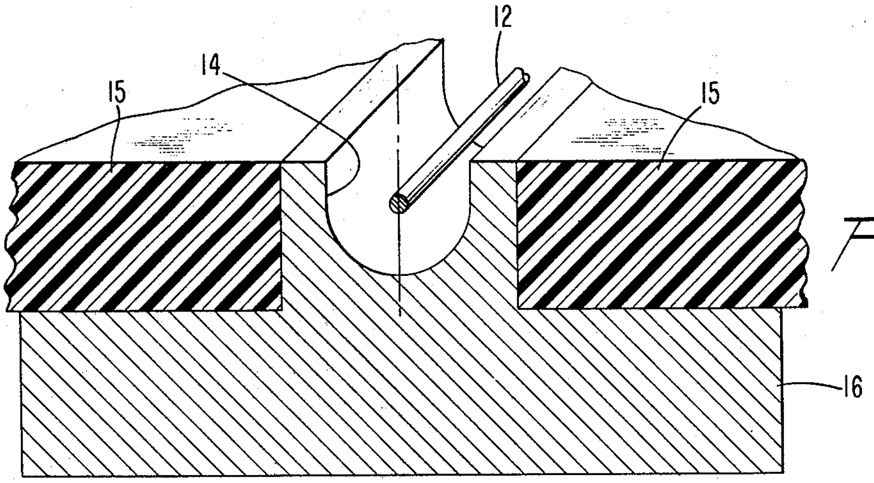
FIG. 5 is a sectional view of the corona discharge apparatus illustrated in FIG. 1.

FIGS. 1 and 5 illustrate a corona discharge assembly 10 which comprises a straight gold plated tungsten corona wire 12 of about 0.001 inch diameter and a semi-cylindrical conductive shield 14. The corona wire 12 is perpendicular to the direction of motion of the dielectric print medium. The semicylindrical shield surface 14, which may be gold-plated, is formed in a conductive shield member 16 that is embraced by support frame 15. The straight-line corona wire 14 may be biased at +2.5 kilovolts relative to ground for producing positive ions to be accelerated toward the dielectric print medium 50 by the negative potential applied to the back plane electrode 70. The shield member 16 and shield surface 14 are maintained at approximately +70 volts relative to the ground by a Zener diode 38 in a manner to be described hereinafter.

APERTURE MASK

Figure 7:
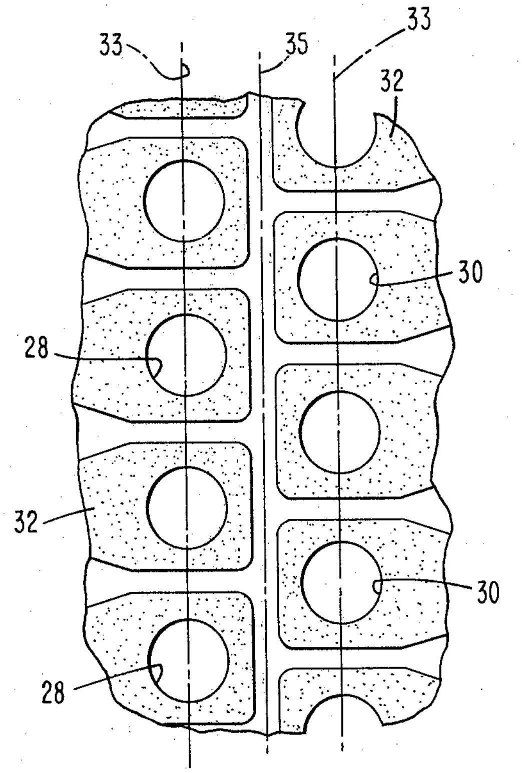
FIG. 7 illustrates the individual aperture electrodes and corresponding apertures within the aperture mask through which ions are selectively passed during imaging onto a dielectric print medium.

The aperture mask 26 is illustrated in FIGS. 1, 2 and 7. The mask assembly 20 comprises three circuit boards which are identified respectively in FIG. 1 by reference numerals 22, 24 and 26. The function of the three circuit boards will be described in detail infra. Circuit board 26, which includes the aperture mask per se, partially envelops the corona discharge assembly 10. Circuit boards 22 and 24 are joined to the ends of the aperture mask 26 by any suitable electrical coupling.

The aperture mask 26 contains two rows of staggered apertures 28 and 30 (FIG. 3) which are located on the top planar portion of the mask which is disposed vertically above the corona wire 12. Each aperture within rows 28 and 30 is surrounded by an individual aperture electrode 32 formed on the side of the mask 26 which faces away from the corona wire 12. Each row of apertures 28 and 30 has a center line 33. The surface of the aperture mask 26 which faces the corona wire 12 has a continuous conductive layer thereon which is biased to a fixed potential, such as +70 volts, by means of Zener diode 38 in a manner to be described hereinafter. This surface also contains a pair of aperture rows, not illustrated, which are aligned with and correspond to the aperture rows disposed on the top surface of the aperture mask to permit passage of ions from the corona discharge assembly 10 to the dielectric print medium 50 for latent imaging purposes. The center line 33 of each of the aperture rows 28 and 30 is perpendicular to the direction of travel of the dielectric print medium 50 and is parallel to the corona wire 12. A hypothetical plane 35 perpendicular to the surface of the aperture mask 26 and containing the corona wire 12, visible in FIG. 7 as center line 35, would be equidistant from the center lines 33. The individual apertures of the aperture rows 28 and 30 are staggered in the direction perpendicular to the direction of motion of the dielectric print medium 50 such that the periphery of each aperture within one of the rows 28 and 30 would just touch the periphery of two adjacent apertures contained in the other of the rows 28 or 30 if both of the aperture rows were in a single line perpendicular to the direction of motion of the dielectric print medium 50.

Only a few representative apertures are shown in FIG. 2 and their spacing has been exaggerated for clarity. In the preferred embodiment of the invention, however, there are 176 individual aperture electrodes within each row of apertures 28 and 30 to form a total array of 352 apertures which may be used to form a high resolution ion image for printing bar code information, alphanumerics, or other information. With selective biasing of the individual aperture electrodes which define rows 28 and 30, the present invention may be used for printing any desired type of information on the moving medium 50 by well-known dot-matrix character generation techniques.

Each aperture electrode within the aperture rows 28 and 30 has associated with it a lead 34 which electrically couples the aperture electrode to the edge of the aperture mask 26 to facilitate electrical contact with leads 36 which are contained on circuit boards 22 and 24 when the aperture mask 26 and the circuit boards are mechanically and electrically joined together.

The leads 36 are coupled to a pulse source, which may be computer controlled, for selectively applying zero or +325 volt pulses to the control electrodes 32 for aperture rows 28 and 30. The instantaneous potentials on aperture electrodes 32 in conjunction with the fixed potential applied to the continuous conductive layer on the opposite side of the mask create fringing fields within the individual apertures of rows 28 and 30 which serve to selectively block or enhance the passage of ions therethrough. Assuming a fixed +70 volt potential on the continuous conductive layer of the mask facing the corona source, it is apparent that the application of +325 volts to an aperture electrode 32 will define an ion blocking condition, while a zero volt aperture electrode voltage will define an ion enhancing or "writing" condition. The sequence of applying control pulses to the aperture electrodes 32 to create particular images is not, however, a part of the present invention.

To fabricate an aperture mask 26 which has the rows of apertures 28 and 30 and associated aperture electrodes 32 as shown, two photolithographic masks are used. A photolithographic mask is prepared which contains a pattern which is identical to the pattern of the aperture rows 28 and 30, aperture electrodes 32, and leads 34 illustrated in FIG. 7. A photoresist is used to form a copper pattern identical to FIG. 7. At this stage of the fabrication process, the aperture mask has individual aperture electrodes 32 which correspond to those illustrated in FIG. 3 but does not have the two rows of apertures 28 and 30 which extend through the aperture mask. At the position where each aperture is to be formed within the rows of apertures 28 and 30, a circular dielectric area is present. A second photolithographic mask is used to form a pattern on the opposite side of the aperture mask 26 which contains a series of apertures which are aligned with the individual apertures within the aperture rows 28 and 30. The exposed dielectric areas of the aperture mask substrate 26 which correspond positionally to the apertures may be mechanically punched out or burned out by a laser. Gold plating may be applied to all exposed copper surfaces after the aperture forming operation to protect the copper surfaces from attack by nitric acid which tends to be formed by the corona source in the presence of moisture.

After completion of the fabrication of the aperture mask, it is bent into a "C" shape as illustrated in FIG. 2 and mechanically and electrically joined to circuit boards 22 and 24 to form the electrical connection of the leads 34 with the corresponding leads 36 of circuit boards 22 and 24. The longitudinal axis of the C-shaped aperture mask is perpendicular to the direction of motion of the dielectric print medium and parallel to the longitudinal axis of the source of ions.

As illustrated in FIG. 1, a 70-volt Zener diode 38 is connected between the continuous conductive surface of the aperture mask 26 and ground or reference potential. In addition, as will be apparent from FIGS. 1 and 6, the upper portion of conductive shield member 16 of the corona unit is in contact with the continuous conductive side of the aperture mask 26 so that electrical connection is established therebetween. Positive ions produced by the corona wire 12 accumulate on the shield surface 14 and on the continuous conductive surface of the aperture mask 26 to cause a potential buildup on these surfaces that is clamped to +70 volts by the Zener diode 38. Zener diode 38 thus functions as a passive voltage regulator for maintaining both shield surface 14 and the continuous conductive side of the aperture mask 26 at a constant potential. Alternatively, a separate D.C. power supply may be substituted for the Zener diode 38.

By virtue of the aforementioned electrical connection between the continuous conductive mask surface and the shield member 16, only one Zener diode is required to fix the potential on both surfaces. Alternatively, the continuous conductive mask surface and the shield member 16 may be electrically isolated from each other by a suitable insulating material and connected to ground through separate 70-volt Zener diodes. Thus, an additional Zener diode (shown in phantom) would be connected between the shield member 16 and ground. This option is preferred when it is desired to provide feedback control for the ion current produced by the corona wire 12, since the current in the independent Zener connection between the shield member 16 and ground will provide a convenient measure of the total ion current produced by the corona wire. By sampling this current and comparing the sampled value to a predetermined reference value, feedback control of the corona wire voltage may be implemented in order to hold constant the ion current available for imaging purposes despite accummulations of debris in the system or changes in humidity, air pressure and the like, all of which may influence the magnitude of the ion flow.

The application of a zero or reference potential to the rows of aperture electrodes 32 relative to the +70 volt potential thus maintained on the side of continuous conductive mask 26 which faces the corona wire 12 permits ions to pass through the aperture mask to the dielectric print medium 50 to form a latent charge image thereon. When the aperture electrode rows are held at the +325 volt potential relative to the side of the aperture mask which faces the corona wire, no ions pass. The manner of operation of multilayer aperture masks of this type is well known and is fully disclosed in the aforementioned U.S. Pat. No. 3,689,935.

FOCUSING PLANE

Figure 6:
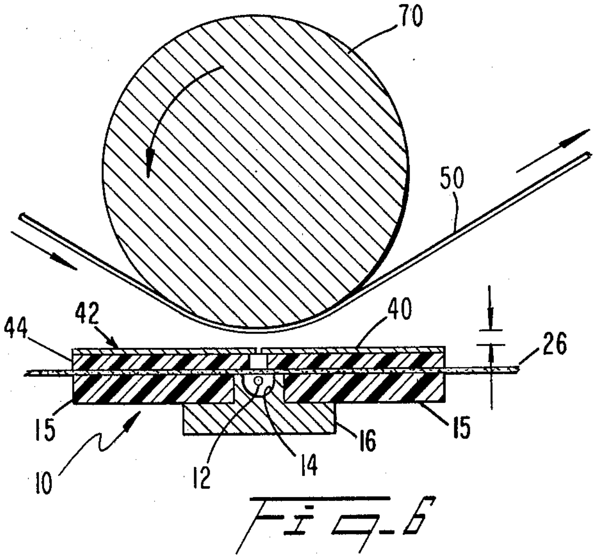
FIG. 6 is an elevational view which illustrates certain dimensions of the embodiment of FIG. 1.

FIGS. 1, 4 and 6 illustrate the slotted focusing plane 40 of the present invention. The focusing plane is manufactured from a single circuit board 42 having a dielectric layer 44 which faces the aperture mask 26 and a conductive layer 46 which faces the dielectric print medium. As illustrated in FIG. 4, the circuit board has a longitudinal slot 48 which is 0.1 inch in width in proximity to the dielectric layer 44 and 0.04 inch in width in proximity to the conductive layer 46. FIG. 1 does not illustrate the actual extension of the circuit board 42 past the aperture electrode rows. It should be understood tha the circuit board extends past the aperture electrode rows 28 and 30 to form the closed slot 48. The slot 48 must extend sufficiently past the rows of aperture electrodes 28 and 30 to permit the free flow of ions between the aperture rows 28 and 30 and the dielectric print medium 50. As is apparent from the foregoing description, the layer 46 is a one-piece metallic layer having a closed slot 48 which overlies the aperture rows 28 and 30. The slot 48 has a center line 49 which is perpendicular to the direction of motion of the dielectric print medium 50 and which lies within the plane 35 that is equidistant the center lines 33 of the aperture rows 28 and 30.

It has been found that the slotted focus plane is most effective when spaced from the aperture electrode side of the aperture mask 26 by a distance of between about one-eighth to one-half the total spacing between the aperture electrode side of the aperture mask and the back plane electrode 70. The width of the slot 48 in the conductive layer 46 of the focus plane (FIG. 4), measured in a direction parallel to the direction of motion of the dielectric print medium, should then be between about one-half the distance between the aperture electrode side of the aperture mask and the back plane and the entire distance between the aperture electrode side of the aperture mask and the back plane, subject to the additional constraint that the slot be sufficiently wide to avoid physically blocking the ion beams produced by the two staggered aperture rows 28 and 30 (FIGS. 2 and 7). The latter constraint will usually, but not necessarily, require the width of the slot 48 to be at least as great as the total distance, referring to FIG. 7, between the leftmost extent of the apertures in row 28 and the rightmost extent of the apertures in row 30.

As a minimum, the width of slot 48 should be at least one-tenth the distance to the aperture electrode side of the mask 26 or to the back plane electrode 70, whichever is closer. Therefore, the minimum required slot width will be greatest when the focus plane 40 is located at the midpoint between the aperture mask 26 and the back plane 70.

In the preferred embodiment, the total spacing between the aperture mask 26 and the back plane electrode 70 is about 0.050 inch. The dielectric layer 44 and conductive layer 46 of the slotted focus plane 40 together have a thickness of about 0.015 inch, leaving about 0.035 inch clearance for the dielectric print medium 50. The width of the slot 48 in the conductive layer 46 is, as noted previously, about 0.040 inch. For these dimensions, it has been found that the slotted focus plane is most effective when the conductive layer 46 thereof is biased at ground or reference potential. It should be understood, however, that other potentials, either positive or negative, may be preferable if the relative position of the focus plane between the aperture mask 26 and the back plane 70 is changed or if the slot width is modified.

Considering for a moment the apparatus of FIG. 1 without the slotted focus plane 40, it will be appreciated that the primary accelerating potential for the ions that impinge on the dielectric print medium 50 is that which exists between the negatively biased back plane electrode 70 and the various aperture-controlling electrodes 32 which, as will be apparent from FIG. 7, are so closely-spaced as to nearly cover the surface of the aperture mask 26 facing away from the corona source in the imaging region. When the slotted focus plane 40 is introduced and biased at a potential near that of the aperture electrodes, the accelerating potential of the back plane electrode 70 is now referenced to the more closely-spaced conductive layer 46 of the focus plane, resulting in a higher field intensity at the surface of the dielectric print medium 50. While this effect will be less pronounced in the region of the slot 48, where the aperture electrodes 32 still provide the nominal reference, there is sufficient fringing of the field lines at the slot edges to carry the field intensifying effect of the focus plane 40 well into the imaging region between the slot edges. In addition, the occurrence of fringing at the slot 48 causes curvature in the trajectories of the ions projected through aperture rows 28 and 30 toward the center line of the slot.

Against this background, the various advantages of the slotted focus plane 40 in connection with an electrostatic imaging system of the type described will be readily apprehended. As mentioned previously, the printing of bar code information for product identification purposes requires the imaging of successive solid lines which are perpendicular to the direction of motion of the print medium 50. To carry out such imaging with the staggered aperture rows 28 and 30 of FIG. 7, a first row of dots is imaged by first pulsing the aperture electrodes of row 28 and then pulsing the aperture electrodes of row 30 after a delay interval to fill in the vacant spaces left between the dots of the first row. The line of dots imaged on the medium 50 by the aperture row 28, however, produces an electrostatic field on the medium 50 which tends to repel the ions being deposited in the vacant spaces by the aperture row 30. As a result, the composite line that is produced has an uneven, staggered edge that may render it unsuitable for use in generating high-resolution bar codes. With the addition of the slotted focus plane 40, however, the accelerating field to which the ions are subjected near the dielectric print medium 50 is intensified. The intensified field counteracts the repulsion produced by the charges already deposited on the print medium, and thereby enables the imaging of smooth-edged lines that are well suited to high-resolution applications such as bar coding.

Two further advantages of the slotted focus plane 40 result directly from the fringing fields and ion path curvature referred to previously. A first consequence of these effects is that the cross-sections of the individual ion beams defined by the circular aperture in rows 28 and 30 are compressed to form ellipses having their major axes parallel to the center line of the slot, and their minor axes parallel to the direction of motion of the dielectric print medium 50. This permits the individual apertures to pass ions for a longer period of time during the imaging of a given dot width on the dielectric print medium, measured in a direction parallel to the direction of motion of the dielectric print medium, than is possible without the focus plane. The increase in time during which ions are passed by the apertures permits higher ion densities to be deposited onto the dielectric print medium, which enhances the clarity and contrast of the final developed image. The resultant dot images also have squarer edges because the image swept out on the moving print medium 50 by the elliptically compressed ion beam more closely approaches a rectangle than the area swept out by a circular cross section. The slightly squared dots thus produced readily merge into the straight-edged vertical lines necessary for printing high-resolution bar codes and the like.

In addition to elliptically compressing the individual ion beams, the slotted focus plane 40 acts to direct the ion beams defined by the aperture rows 28 and 30 toward the center line 49 of the slot, which has the effect of directing the ion beams toward each other at the plane of the moving dielectric print medium 50. This has the effect of reducing the delay interval that must occur between the pulsing of the two staggered aperture rows to define a complete image, and therefore reduces the amount of imaging information that must be stored between successive pulsing of the staggered rows. Since electronic RAM circuitry is typically used to store bar code imaging information for the interval between pulsing of the successive rows, use of the slotted focus plane effectively reduces the memory capacity required.

In addition to its utility in connection with the imaging of bar code information, it will be apparent that the focus plane 40 of the present invention is useful in increasing the image resolution of alpha-numeric indicia in a direction parallel to the direction of motion of the dielectric print medium 50. The printing of alphanumeric latent images with the aperture mask 26 of the invention will involve the activation of only selected segments of the aperture electrode 32 associated with the rows 28 and 30.

PAPER AND BACK PLANE

The dielectric medium 50 on which a latent image is to be produced moves from left to right as viewed in FIGS. 1 and 6 in contact with the lower periphery of a back plane electrode 70. The back plane is a metallic cylinder and in the preferred embodiment is spaced by about 0.050 inch from the aperture mask 26. The back plane 70 has a circumference which when viewed from the slot 48 appears to be substantially planar. A high negative accelerating potential of about −2 kilovolts is applied to the back plane 70 which acts through the dielectric print medium 50 in order to propel ions toward the print medium for imaging.

FIG. 3 illustrates the composite structure of the dielectric print medium 50. A dielectric layer 54 is provided which receives the latent electrostatic image. The layer 54 is supported by a base paper 56 which is conductive so that the field lines from the focusing slot 44 terminate in a substantially perpendicular fashion against the dielectric layer 54. A layer of pressure sensitive adhesive 58 is applied to the upper surface of the base paper 56. Over the adhesive layer 58, another dielectric layer 60 is applied which is treated with silicone so that it may be stripped easily from the adhesive layer 58. The exposed side of the layer 60 is treated to provide a conductive surface 62 of a desired resistivity. For example, a conductive salt solution wash may be applied to dielectric layer 60 which leaves conductive surface 62 with a resistivity of between about $10^7$ and $10^8$ ohms per square. Typically, the overall thickness of the dielectric print medium, including the strippable release layer 60, will be about 0.007 to 0.008 inch.

A paper may be used which contains only the dielectric layer 54 and the base paper 56. The multiple layer paper which includes the additional adhesive layer 58, dielectric layer 60 and resistance layer 62 is desirable for manufacturing a roll of labels which have had waste material consisting of layers 54 and 56 located outside the label area stripped from the roll.

OPERATION

The dielectric print medium 50 may be moved at about seven inches per second and the individual aperture electrodes within the rows 28 and 30 of the aperture electrodes may be selectively pulsed by a +325 volt pulse source having a frequency of 700 Hz. The theoretical resolution of the system is the rate of travel of the dielectric print medium divided by the frequency of the pulse source which yields 100 dots per inch in a direction parallel to the direction of travel of the dielectric print medium. To maintain the same resolution with higher dielectric print medium velocities, the frequency of the pulse source must be proportionately increased and the pulse width decreased.

In the preferred embodiment, the apertures in each row on the aperture mask are 0.010 inch in diameter, and the dot resolution measured in the direction perpendicular to the motion of the dielectric print medium is 100 dots per inch, taking into account both staggered rows. The center lines 33 of the two aperture rows are preferably 0.020 inch apart.

If it is desired to print a single-width image such as a line or bar extending in the direction perpendicular to the direction of dielectric print medium travel, the aperture electrodes 32 associated with aperture row 28 must first be pulsed and then the aperture electrodes 32 associated with aperture row 30 must be pulsed after a suitable delay interval to permit the two images to merge to form a single straight line on the dielectric print medium 50. Multiple width lines are produced by successive pulsing of the aperture electrodes 32 associated with row 28 and the aperture electrodes 32 associated with aperture row 30. As described above, the printing of alpha-numeric information, bar codes or any other desired information with the print head of the present invention may be accomplished by the selective pulsing of the aperture electrodes 32 associated with aperture rows 28 and 30.

In addition to the field intensification, dot compression and beam convergence effects described previously, the slotted focusing plane 40 has a number of other advantages when used in connection with an electrostatic imaging system of the type described. The presence of the focusing plane, for example, tends to reduce instances of voltage breakdown to the apertures on the aperture mask 26. Moreover, the physical interposition of the focus plane between the aperture mask and the back plane 70, on which the dielectric print medium 50 is supported, eliminates the possibility of the dielectric print medium coming into contact with the aperture mask and perhaps obstructing it with dust particles or other debris.

The present invention has been described with reference to a preferred embodiment. It should be understood that the present invention is not limited to the description of the preferred embodiment. For example, other biasing potentials may be used, and different dot resolutions and geometrical relationships between the corona discharge assembly 10, aperture mask 26, focus plane 40 and back plane 70 may be made without departing from the invention. Moreover, the invention is equally applicable when more than two rows of apertures are provided on the aperture mask 26. All such modifications are intended to be embraced within the scope of the appended claims.

What is claimed is:

1. An electrostatic print head comprising:

(a) an elongated source of ions, the source of ions having a longitudinal axis, (b) a back plane which is adapted to movably support a moving dielectric print medium on which an image is to be formed by ions produced by the source of ions, (c) an aperture mask having two substantially parallel rows of apertures through which ions may be selectively passed by the application of a pulse to an aperture electrode associated with each aperture within the two rows of apertures, each row of apertures having a center line which is substantially parallel to the longitudinal axis of the ion source and substantially perpendicular to the direction of motion of the dielectric print medium, the aperture mask being disposed between the source of ions and the back plane, (d) means for establishing an electric field between the aperture mask and the back plane for propelling ions passing through the aperture mask from the elongated source of ions toward the dielectric print medium, (e) a focus plane disposed between the back plane and the aperture mask having a slot with a center line disposed substantially parallel to the center lines of the aperture rows, and substantially perpendicular to the direction of motion of the dielectric print medium, for modifying the electric field between the aperture mask and the back plane upon the application of a bias potential to the focus plane, and (f) means for applying a bias potential to the focus plane.

2. An electrostatic print head in accordance with claim 1, wherein said means for applying a bias potential applies a ground potential to the focus plane.

3. An electrostatic print head in accordance with claim 1, wherein said means for applying a bias potential applies a positive potential to the focus plane.

4. An electrostatic print head in accordance with claim 1, wherein said means for applying a bias potential applies a negative potential to the focus plane.

5. An electrostatic print head in accordance with claim 1, wherein (a) the aperture mask has two opposed surfaces, the first surface facing the focus plane and having the aperture electrodes thereon, the second surface facing the elongated source of ions and having a continuous conductive layer thereon, and (b) the elongated source of ions comprises a wire which is adapted to be maintained at a high electrical potential for generating a corona discharge, and a semicylindrical shield disposed in proximity to the wire, said semicylindrical shield having a longitudinal axis parallel to the axis of the wire.

6. An electrostatic print head in accordance with claim 5, further comprising passive voltage regulating means for limiting the charge accumulated by the semicylindrical shield and by the continuous conductive surface of the aperture mask from the source of ions such that the semicylindrical shield and the continuous conductive surface of the aperture mask remain at a constant potential.

7. An electrostatic print head in accordance with claim 6, wherein the semicylindrical shield and the continuous conductive surface of the aperture mask are in electrical contact, and wherein said passive voltage regulating means comprises a Zener diode connected between the continuous conductive surface of the aperture mask and ground.

8. An electrostatic print head in accordance with claim 6, wherein the semicylindrical shield and the continuous conductive surface of the aperture mask are electrically isolated from each other, and wherein said passive voltage regulating means comprises:

(a) a first Zener diode connected between the continuous conductive surface of the aperture mask and ground, and (b) a second Zener diode connected between the semicylindrical shield and ground.

9. An electrostatic print head in accordance with claim 7 or 8, wherein the aperture mask is bent to form a C-shaped cross-section which partially envelops the elongated source of ions and has a longitudinal axis parallel to the longitudinal axis of the source of ions.

10. An electrostatic print head in accordance with claim 1, wherein (a) the focus plane is spaced from the continuous conductive surface of the aperture mask by a distance of approximately one-eighth to one-half of the distance between the continuous conductive surface of the aperture mask and the back plane; and (b) the focus plane has a conductive layer defining said slot, said slot having a width measured in the direction parallel to the direction of motion of the electrostatic print medium which is between approximately one-half of the distance between the continuous conductive surface of the aperture mask and the back plane and the whole distance between the continuous conductive surface of the aperture mask and the back plane.

11. An electrostatic print head in accordance with claim 10, wherein said means for applying a bias potential applies a ground potential to the conductive layer of the focus plane.

12. An electrostatic print head in accordance with claim 11, wherein the focus plane includes a dielectric layer which faces the surface of the aperture mask having the aperture electrodes thereon, and which supports said conductive layer.

13. An electrostatic print head in accordance with claim 5, wherein the dielectric print medium is a paper comprising (a) a dielectric layer which faces the focus plane; and (b) a conductive layer which is electrically coupled to the back plane and which is movably supported by the back plane during imaging of ions on the dielectric print medium.

14. An electrostatic print head in accordance with claim 11, wherein (a) the semicylindrical shield is maintained at a potential of approximately +70 volts, (b) the continuous conductive surface of the aperture mask is maintained at a potential of approximately +70 volts, (c) the aperture electrodes are selectively biased at ground potential to pass ions from the source of ions to the dielectric print medium through the apertures and at approximately +325 volts to block the flow of ions from the source of ions to the dielectric print medium through said apertures, and (d) the back plane is maintained at a potential of approximately −2 kilovolts.

15. An electrostatic print head in accordance with claim 1, wherein (a) the apertures of the aperture electrode rows are staggered in a direction perpendicular to the direction of motion of the dielectric print medium, (b) the aperture mask further comprises a lead associated with each aperture electrode which connects the aperture electrode to one of two edges of the aperture mask, one half of the leads being coupled to one edge of the aperture mask and the other half of the leads being connected to the other edge of the aperture mask, (c) a first circuit board having a plurality of leads equal in number to one half of the leads contained on the aperture mask, the leads of the first circuit board being electrically coupled to the one half of the leads coupled to one edge of aperture mask, and (d) a second circuit board having a plurality of leads equal in number to one half of the leads contained on the aperture mask, the leads of the second circuit board being electrically coupled to the remaining one half of the leads contained in the aperture board which are coupled to the remaining one of the two edges of aperture mask.

16. An electrostatic print head in accordance with claim 15, wherein the stagger is such that in a direction perpendicular to the direction of motion of the dielectric print medium the periphery of each aperture in one of the rows of aperture electrodes would contact the periphery of two apertures contained in the other row of aperture electrodes if the two rows of apertures were placed in a single line.

* * * * *